W. J. CLELLAND.
COMBINED HAND AND AIR BRAKE.
APPLICATION FILED OCT. 21, 1912.
1,061,900.
Patented May 13, 1913.
2 SHEETS—SHEET 1.
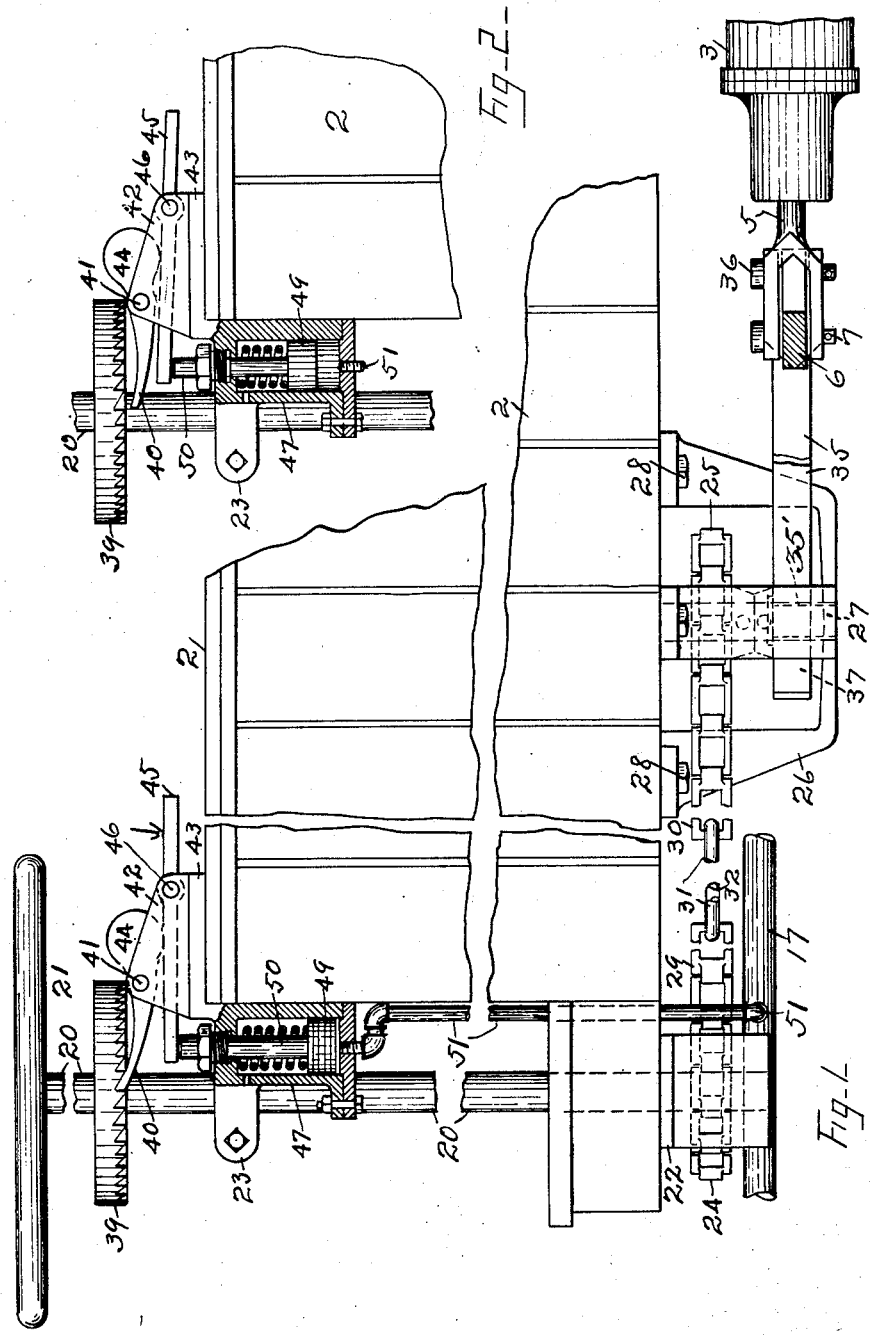
WITNESSES:
INVENTOR.
WILLIAM J. CLELLAND
BY
ATTORNEY.

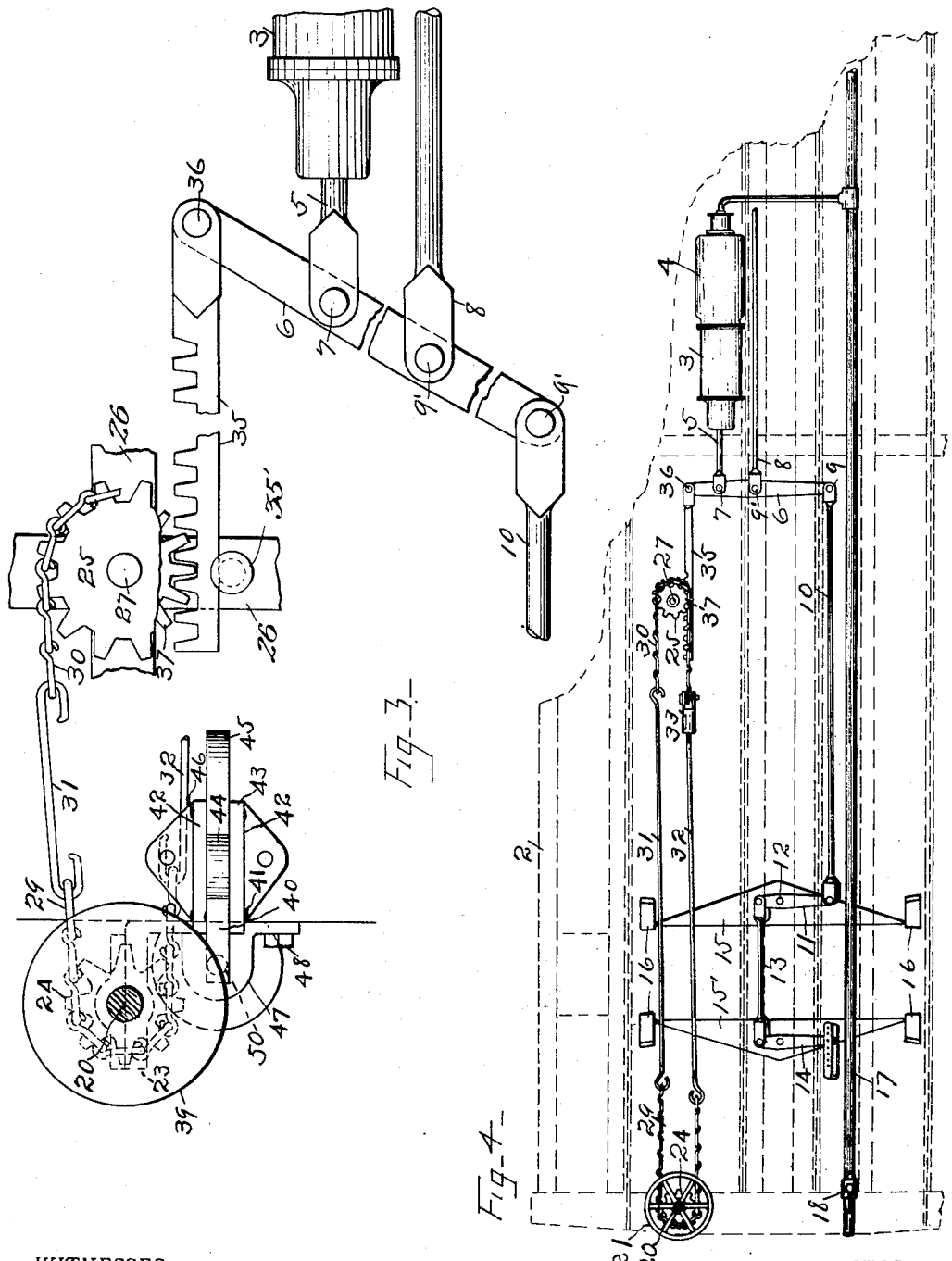

UNITED STATES PATENT OFFICE.

WILLIAM J. CLELLAND, OF WATERTOWN, NEW YORK, ASSIGNOR OF ONE-HALF TO WATERTOWN SPECIALTY COMPANY, OF WATERTOWN, NEW YORK, A CORPORATION OF NEW YORK.

COMBINED HAND AND AIR BRAKE.

1,061,900.

Specification of Letters Patent. Patented May 13, 1913.

Application filed October 21, 1912. Serial No. 726,921.

*To all whom it may concern:*

Be it known that I, WILLIAM J. CLELLAND, a citizen of the United States, residing at Watertown, in the county of Jefferson and State of New York, have invented certain new and useful Improvements in Combined Hand and Air Brakes, of which the following is a specification.

This invention relates to improvements in car brakes, and has for its object to provide novel, simple and effective means for operating the hand brake mechanism simultaneously with, and by means of the fluid pressure employed for operating, the automatic brakes of railroad cars.

A further object is to provide means interposed between the air brake cylinder and the hand brake shaft, whereby whenever the engineer sets and releases the automatic brakes, the hand brake shaft is also rotated in the directions for setting and releasing the brakes.

A further object is to provide means for setting and releasing the brakes of a car by hand independently of the air brake mechanism.

A further object is to provide for operating the hand brake shaft for setting the brakes by exhausting the air confined in the train pipe by opening one of the anglecocks carried by said pipe.

A further object is to provide means for locking and holding the hand brake shaft in the "set" position after each application of the air.

A further object is to provide fluid pressure means for releasing the hand brake shaft independently of the main brake cylinder carried by the car. And a further object is to provide means for operating the hand brake mechanism for setting and releasing the brakes without the use of any fluid pressure.

The various features and parts of the invention will be understood from the detailed description which follows, and by reference to the accompanying drawings which form a part of the specification, and in which—

Figure 1 is a broken elevational view of a car; showing the construction and arrangement of the hand brake mechanism in connection with parts of the automatic air brake; also showing the hand brake shaft locked for preventing the release of the brakes. Fig. 2 is a detail view; showing the releasing of the hand brakes by fluid pressure independent of the automatic brake cylinder. Fig. 3 is an enlarged plan view of the improved hand brake mechanism and parts of the automatic air brake mechanism; showing the position of the parts when the brakes are released. Fig. 4 is a reduced plan view; showing the preferred arrangement of the hand brake and automatic air brake mechanisms in relation to the car; also showing the position of the braking parts when the brakes are set.

Heretofore, all freight cars have been provided with a double braking equipment, comprising the old hand brakes, which are generally operated by means of upright shafts fitted with hand-wheels, which are located at the ends of the cars, and the well-known automatic air or fluid pressure brake systems. The hand brakes are indispensable, for the reason that, when a locomotive is cut off from a train of cars, the air pressure used for operating the automatic brakes is destroyed, so that the hand brakes afford the only means for braking and holding the cars when not in transit, and these must be set and released by the trainmen. When one or more cars are placed on a siding, the brakes must be set for preventing the accidental movement of the cars. To do this work the trainmen must climb upon and over the cars and operate the hand brakes one by one. This is a tedious job, and consumes a great deal of time, both for the setting and releasing of the brakes.

It is an object of the present invention to so construct and arrange the hand brake mechanism as to provide for its operation, for setting and releasing the brakes, by means of the fluid-pressure which controls the automatic air brakes.

In the drawings, 2 represents a freight car, which may follow the usual construction. The style of the car is unimportant, as my improvement may be applied with slight changes to a great variety of railway vehicles.

Since the present invention depends in part for its operation upon the well-known automatic air brake equipment which is employed on all railroad rolling stock, I will describe and show only such parts of the air brake system as bear direct relation to the present improvement.

3 represents the brake cylinder, 4 the reservoir which supplies the fluid pressure to the cylinder, and 5 the piston or push-rod which is actuated by said cylinder. The rod 5 is operatively connected to the cylinder lever 6 by a pin 7. The lever 6 is pivoted at its center to a rod 8. The opposite end of the lever 6 connects by a pin 9 to one end of a rod 10, the other end of the rod 10 connecting to one end of the "live" truck-lever 11, which is pivoted at 12, in the usual way. The opposite or lower end of the lever 11 connects with the brake rod 13, which connects with the lower end of the "dead" truck-lever 14. The levers 11 and 14 may be connected to the brake beams 15 and 15', which support the brake-shoes 16, in any suitable manner.

The parts of the automatic air brake just described constitute the braking mechanism commonly applied to one end of a car.

17 represents the train-pipe, which supplies the fluid-pressure for operating the automatic brake system, and this pipe is disposed beneath the car.

18 represents an angle-cock carried by the train-pipe, which is located in a convenient position at the end of the car.

The hand brake mechanism will now be described.

20 represents an upright shaft which is positioned at the end of the car. The upper end of the shaft 20 extends above the top of the car and is fitted with a hand-wheel 21, by means of which the shaft is manually rotated. The lower end of the shaft 20 extends below the bottom of the car where it is supported by a bracket 22. 23 represents another bracket which supports the upper portion of shaft 20, the latter bracket being suitably fastened to the end of the car.

24 represents a sprocket-wheel which is rigidly mounted on the lower end of shaft 20. 25 represents a second sprocket-wheel which is pivoted in a bracket 26 by a pin 27, the bracket 26 being secured to the underside of the car by bolts 28. The sprocket-wheels 24 and 25 are operatively connected by means of similar sections of chains 29 and 30 and rods 31 and 32, the said chains and rods forming, when connected together, an endless drive for the sprocket-wheels. The rod 32 is preferably provided with a turnbuckle 33 for the purpose of adjusting the drive. The chain and sprocket gears operatively connect with the cylinder lever 6 by means of a rack-rod 35 one end of which is pivoted to the lever 6 by a pin 36. The rack-portion of the rod 35 meshes with the teeth of a pinion 37, which is rigidly mounted on the shaft 27. The rack-rod 35 is held in engagement with the pinion 37, by means of a pin or stud 35', as shown in Figs. 1 and 3. The operation of the lever 6 by the push-rod 5, when the latter is driven in opposite directions by the air pressure in the cylinder 3, reciprocates the rack-rod 35, which in turn rotates the pinion 37, shaft 27, sprocket-gears 24 and 25, and the hand brake shaft 20. On the other hand, a brakeman may take hold of the hand-wheel 21, while the brakes are released, and turn it to the right. This will rotate the shaft 20 and the gears 24 and 25, and operate the lever 6 and the brake-beams 15 and 15', which will effect the setting of the brakes. To hold the brakes in the set position when operated by means of the hand-shaft 20, as well as, by the opening of the angle-cock 18, I provide a ratchet-wheel 39 which is made rigid on the said shaft, above the top of the car, and I then provide a pawl 40 which is pivoted by a pin 41 between lugs 42 of a bracket 43, which is mounted on the top of the car. One end of the pawl 40 is arranged to engage the teeth on the under side of the wheel 39 for preventing the recoil of the shaft 20, after the brakes have been set by hand. The opposite end of the pawl 40 is counter-weighted at 44, which serves to hold the point of the pawl normally in engagement with the teeth of the ratchet-wheel. The releasing of the pawl 40 from the teeth of the ratchet-wheel, is accomplished by a lever 45, which is also pivoted by a pin 46 between the lugs 42, directly beneath the pawl. In case the brakeman desires to release the pawl 40, he places one foot upon the end of the lever 45 at the point indicated by the arrow in Fig. 1. The downward pressing of the lever 45 lifts the counter-weighted end of the pawl and throws the opposite end out of engagement with the teeth of the ratchet. When the brakes have been set by hand through the manipulation of the shaft 20, as described, they may be released in a simple manner, by fluid-pressure means, without requiring the brakeman to go on top of the cars. To this end, I provide a cylinder 47, which is secured to the end of the car a short distance below the roof by bolts 48. The cylinder 47 is provided with a piston 49, and a piston rod 50 which pierces and projects above the upper end of the cylinder, the upper end of the piston rod engaging the under side of the releasing lever 45. The charging of the cylinder 47 with pressure derived from the train-pipe 17, by means of a branch pipe 51, drives the piston and rod 50 upwardly, rocks the lever 45, and thereby releases the pawl 40.

It is a common practice, while trains are in transit for the train-pipe to be constantly charged with the air pressure which is employed for setting the brakes. This being the normal condition of the train-pipe, the cylinder 47 is also normally charged with the air pressure through the branch pipe 51, which maintains the piston rod 50 in its extended position, as shown in Fig. 2. During all such intervals the pawl 40 is held away from the ratchet 39, so that the hand-brake shaft 20 may be freely rotated, either by hand, or by the engineer whenever he releases or restores the train line pressure. It is only when the brakes are released by the exhausting of the air pressure from the train line, that the pawl is normally engaged with the ratchet 39 ready to lock the shaft 20. It will be understood from the foregoing, that as long as there is any air pressure in the train-pipe 17, either the engineer, through his releasing valve, or the brakemen, through the uncoupling of the air-hose or by opening an angle-cock carried by the train pipe, may release the air pressure and effect the setting of the brakes, and in doing so, the hand-brake shaft 20 of each car will be operated, as described, and the pawl and ratchet carried by each shaft will automatically lock the parts and hold the brakes from releasing. Under this arrangement it is not necessary for the trainmen to climb upon any of the cars in order to set the hand brakes for holding the cars from movement after the engine is cut off. For ordinary shifting of the cars, when the train-pipe is uncharged, the brakeman must go upon the cars and release the hand brakes by stepping upon the releasing lever 45, thereby throwing the pawl 40 out of engagement with the ratchet 39. Then after the cars have been switched to their new position, he must also reset the hand brakes in the usual way by manipulating the hand-wheels 21. If however, when the locomotive is coupled on to the idle cars, the train line of the air brake system is also coupled up, the engineer may release the hand-brakes by charging the train line with the air pressure, in which case the air pressure operates the piston 49 of the cylinder 47, and then the piston rod 50 lifts the lever 45 and releases the pawl, as shown in Fig. 2. In case the air connections still remain unbroken at the end of the switching operation, the brakes may be set, either by the engineer, or by the trainmen releasing the air from the train-line. In either case the trainmen need not go upon the cars to operate the hand-brake shaft 20. Under the present practice, when freight cars are run on a siding, the uncoupling of the air-hose sets the brakes, and if left in this position, the cars are simply held by the air-pressure which remains in the reservoirs of the brake cylinders. As all of these reservoirs and their connections are liable to leakage, the pressure in the reservoirs is soon reduced to nothing, and the brakes, unless otherwise held, are automatically released. The cars are then liable to gravitate, or to be driven by the wind, onto the main track and cause serious accidents. With the present invention, no matter how the brakes are set, they will be automatically and positively locked and can only be released by a trainman going on top of the cars, or else by the recoupling of the locomotive and the recharging of the train-pipe, as described.

My improved braking system is extremely simple, and can be installed at a small expense. By its use a great deal of time may be saved in the handling of freight or other cars, and in addition the said work may be carried out more conveniently and with greater safety to the employees, than is possible under the old system, where the hand and automatic brakes are operated separately.

Having thus described my invention, what I claim as new and desire to secure by Letters Patent, is—

1. A car brake, comprising a shaft adapted to be operated by hand, a sprocket-gear carried by said shaft, a second sprocket-gear, a chain connecting said gears, a rack-rod for operating said sprocket-gears, a fluid-pressure cylinder for operating said rack-rod, means for locking said shaft after the brakes are set, and a fluid-pressure cylinder for releasing said locking means.

2. A car brake, comprising a manually operable shaft, means for locking said shaft for preventing the releasing of brakes when set, a fluid-pressure device for releasing said locking means, a chain and sprocket gearing operatively connected to said shaft, a fluid-pressure brake cylinder, a piston operated by said cylinder, and a rack-rod operated by said piston, said rack-rod adapted to operate said chain and sprocket gearing for automatically rotating said shaft.

3. The combination with a fluid-pressure brake cylinder and a push-rod operated thereby, of a sprocket-gear, a rack-rod reciprocated by said push-rod for rotating said sprocket-gear, a hand-brake shaft, a sprocket-gear carried by said shaft, a chain drive for connecting said sprocket-gears, whereby when the brakes are set and released by said brake cylinder said shaft is rotated in opposite directions, means for locking said shaft for holding the brakes when set, and a releasing lever capable of being rocked by fluid-pressure or by foot-power for releasing said locking means.

4. A car brake, comprising a hand-brake shaft, a pair of sprocket-gears, one of said gears carried by said shaft, a chain for connecting said gears, a cylinder lever, a rack-and-pinion for connecting said lever with one of said sprocket-gears, brake-beams, means for operatively connecting said lever with said brake-beams, a ratchet carried by said shaft, a pawl engaging said ratchet for holding the brakes when set, and a rocking-lever adapted for disengaging said pawl for permitting the releasing of the brakes.

5. A car brake, comprising a hand-brake shaft, a pair of sprocket-gears, one of said gears carried by said shaft, a chain for connecting said gears, a cylinder lever, a rack-and-pinion for connecting said lever with one of said sprocket-gears, brake-beams, means for operatively connecting said lever with said brake-beams, a ratchet carried by said shaft, a pawl engaging said ratchet for holding said shaft from rotating in the direction for releasing the brakes, a rocking-lever adapted to disengage said pawl, and a fluid-pressure cylinder having a piston adapted to operate said rocking-lever for releasing the brakes.

6. The combination with an automatic brake cylinder and a push-rod operated thereby, of a pair of sprocket-gears, a rack-rod and a cylinder-lever for connecting said push-rod with said sprocket-gears, a hand-brake shaft capable of driving and being driven by said sprocket-gears, a pawl and ratchet for locking said shaft, a lever for releasing said pawl, and independent fluid-pressure means for operating said releasing lever.

7. A car brake, comprising a hand-brake shaft, a pair of sprocket-gears for operating said shaft, a cylinder lever, a rack-and-pinion for connecting said lever with one of said sprocket-gears, brake-beams, means for operatively connecting said lever with said brake-beams, a pawl-and-ratchet for locking said shaft when the brakes are set, and a rocking-lever adapted for releasing said shaft.

8. In a combined hand and air brake, the combination of a shaft, a gear operatively connecting with said shaft, a cylinder lever, a rack-rod connecting said lever with said gear, a fluid-pressure cylinder having a piston operatively connecting to said lever adapted to rock said lever for rotating said shaft during the setting and releasing of the brakes, means for locking said shaft when rotated in the direction for setting the brakes, and means operable by foot-power for releasing said locking means.

9. The combination with the automatic air brake cylinder and the cylinder lever operatively connected thereto, of a shaft, a train of gears for connecting said shaft with the cylinder lever, whereby said lever may be operated for setting and releasing the brakes by the manual operation of the said shaft, the said gears adapted for rotating said shaft when said lever is operated by said brake cylinder, means for locking the said shaft, and fluid-pressure actuated means for releasing said shaft.

10. The combination with the hand-brake shaft and the fluid-pressure brake cylinder, of a gearing operatively connected to said shaft, a rack-rod adapted to be reciprocated by the brake cylinder for rotating said shaft, said rack-rod adapted to be reciprocated by said gearing when said shaft is operated by hand, means for locking said shaft after each setting of the brakes, and a rocking lever adapted to be operated either by foot-power or by fluid-pressure actuated means for releasing said shaft.

11. The combination with a brake cylinder, and a train-pipe for supplying fluid-pressure to said cylinder for automatically setting the brakes of a car, said train-pipe having an angle-cock, of a hand-brake shaft, a train of gears connecting with said shaft, a rack-and-pinion for operating said gears when said brake cylinder sets the brakes, said gears adapted to operate said rack and pinion when the brakes are set by hand, means for locking said shaft for preventing the releasing of the brakes, means adapted to be charged with fluid-pressure from said train-pipe for preventing the locking of said shaft, and adapted to automatically lock said shaft by the opening of said angle-cock.

In testimony whereof I affix my signature in presence of two witnesses.

WILLIAM J. CLELLAND.

Witnesses:
N. D. YOST,
L. DE L. BERG.